Oct. 24, 1944.  B. PICARD ET AL  2,361,234
ENGRAVING MACHINE
Filed March 21, 1942  8 Sheets-Sheet 2

Inventors:
Benjamin Picard
and Anthony F. Ward
By
Attorneys.

Fig. 3.

Oct. 24, 1944. B. PICARD ET AL 2,361,234
ENGRAVING MACHINE
Filed March 21, 1942 8 Sheets-Sheet 5

Inventors:
Benjamin Picard
and Anthony F. Ward
By
Attorneys.

Patented Oct. 24, 1944

2,361,234

UNITED STATES PATENT OFFICE 2,361,234

ENGRAVING MACHINE

Benjamin Picard and Anthony F. Ward, Cranston, R. I.

Application March 21, 1942, Serial No. 435,604

18 Claims. (Cl. 90—24.5)

The present invention relates to an engraving machine and more particularly to a machine adapted to engrave intricate designs directly on the surface of a work-piece.

Although the machine of the present invention may be used for engraving many kinds of work it is particularly adapted for engraving the surfaces of cylindrical rolls used for printing fabrics and similar materials. The best grades of fabric prints are produced by printing rolls having the design hand-engraved on their peripheries. Such hand-engraving is laborious and time consuming so that this method of preparing the printing rolls is too expensive for most uses. The printing rolls usually have the design repeated both around their circumference and longitudinally thereof and to save time and expense a single reverse design is sometimes hand-engraved on a hardened steel hob which is pressed against the periphery of the copper printing roll to transfer the design thereto; the design being repeated both circumferentially and longitudinally of the roll in this manner. While this latter method of preparing printing rolls is less costly than hand-engraving the whole periphery of the roll it is more expensive than the etching process commonly used.

Etched printing rolls are first coated with a varnish which is acid resistant and the design to be etched is scratched through the varnish on the periphery of the rolls by a pantograph etching machine. Pantograph etching machines usually comprise a series of scratching tools corresponding to the number of repeats in the design to be reproduced. A pattern of the design to be etched is traced by a stylus and through suitable mechanical connecting means the printing roll and tools are moved relatively to scratch the design through the varnish. The roll with the design scratched through the varnish is then immersed in an acid bath which eats out the metal where the varnish is removed to reproduce an intaglio of the design in the periphery of the roll. Due to the liability of chipping the varnish and the undercutting of the edges of the lines by the acid the design is not always reproduced accurately on the periphery of the printing roll and the edges of the design must be sharpened manually with a suitable routing tool. Although etched rolls will not print a design as accurately and satisfactorily as hand-engraved rolls they are used extensively since they may be prepared more expeditiously and at less cost. The etching machines, however, cannot be used to engrave the design directly in the periphery of the printing rolls as the resistance to a series of tools cutting into the work would be transmitted back to the tracing stylus and prevent free movement of the latter to trace the pattern of the design.

One of the objects of the present invention is to provide a machine for engraving a design directly on the surface of the work-piece by merely tracing the pattern of the design with a manually-operable stylus.

Another object is to provide a machine of the type indicated having power-operated means controlled by the movement of the stylus and connected to move the cutting tool and work-piece relatively, one to the other, to engrave a reproduction of the design on the surface of the work-piece as the pattern is traced by the stylus.

Another object is to provide a machine of the type indicated with power-operated means for relatively moving the cutting tool and work in two directions at right-angles to each other.

Another object is to provide a machine of the type indicated embodying a plurality of cutting tools for simultaneously engraving repeats of the design both longitudinally and circumferentially of a cylindrical work-piece.

Another object is to provide a machine of the type indicated having power-operated means for simultaneously turning the several cutting tools to face them in the direction of the cuts being made as the cutting tools and work-piece are moved relatively in any direction.

Another object is to provide a machine of the type indicated in which the stylus is movable freely in any direction to trace a pattern of a design and rotatable on its axis to face in the direction of the lines of the design being traced.

Another object is to provide a machine of the type indicated having means for transmitting the movement of the stylus to actuate the several power-operated means.

Another object is to provide power means in the machine in the form of servo-motors having freely movable control members adapted to be operated by the stylus and power-operated pistons which follow the movement of the control members to move the cutting tools and work-piece, one relatively to the other.

Still another object is to provide a machine of the type indicated with electromagnet-operated means for controlling the engagement of the tools with the surface of the work-piece.

Further objects of the invention are set forth in the following specification which describes a preferred form of machine, by way of example, as illustrated by the accompanying drawings. In the drawings.

Machine in general

In general, the machine incorporating the novel features of the present invention comprises a frame for supporting a table on which the pattern of the design to be engraved is mounted. Overlying the table is a lower carriage mounted on tracks for movement forwardly and rearwardly with respect to the front of the machine. An upper carriage is mounted on tracks on the lower carriage for lateral movement at right-angles to the direction of movement of the lower carriage. A stylus attached to the upper carriage is adapted to be moved manually in any direction to trace the outline of the design to be engraved and such motion is translated by the upper and lower carriages into two components of motion in directions at right-angles to each other. The stylus is also rotatable on its axis to adapt it to face in the direction in which it is moved.

The work-piece to be engraved may be in the form of a cylindrical printing roll adapted to be mounted on a mandrel journaled in the machine frame. A tool-support positioned adjacent the work-piece mounts a series of tool-posts with cutting tools corresponding to the number of repeats of the design to be engraved on the roll. The tool-posts are adjustable with extreme accuracy toward and away from each other and the individual cutting tools are adjustable toward and away from the axis of the work to vary the depth of the cut. Separate power-operated servo-motors are provided which are connected respectively to oscillate the cylindrical work-piece, slide the tool-support longitudinally of the work-piece and turn the cutting tools to face in the direction in which the cut is to be made. Each of the servo-motors comprises a freely movable control member and a power-operated piston connected to the part to be driven, the power-operated pistons being instantaneously operative to follow the movement of the control member. The control members of two of the servo-motors are connected through motion-reducing mechanism to be actuated by the movement of the upper and lower carriages as the outline of the design is traced by the stylus so as to move the work-piece and tools relatively in two directions at right-angles to each other. The control member of the third servo-motor is arranged to be actuated by the rotation of the stylus on its axis. The machine of the present invention is therefore adapted to cut a reproduction of a selected design directly on the surface of the work-piece as the pattern of the design is traced by the stylus without any resistance to the action of the cutting tools interfering with the free movement of the stylus. A manually-controlled electric circuit is also provided in the machine including electromagnets for controlling the simultaneous engagement or disengagement of the several cutting tools with the surface of the work-piece.

Frame and work-support

Figure 1:
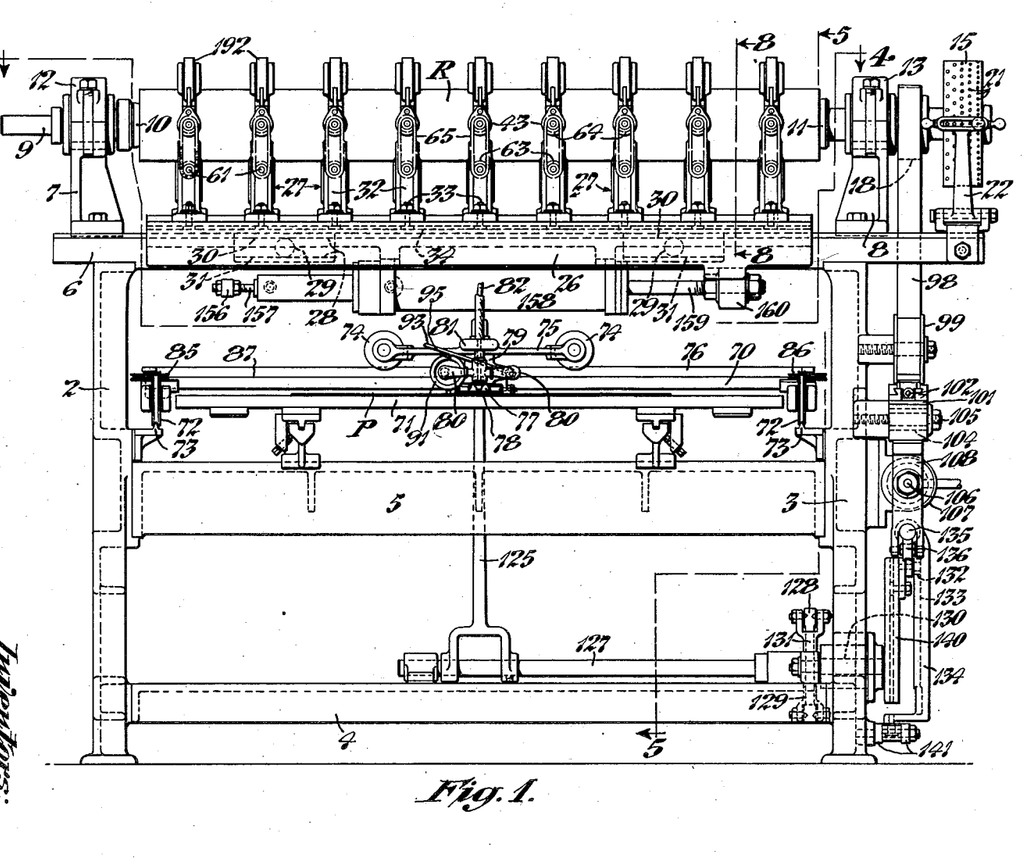
Fig. 1 is a front elevational view of an engraving machine incorporating the novel features of the present invention and showing the power-operated means for sliding the tool-support longitudinally of the work-piece.

As illustrated in Fig. 1, the frame of the machine comprises end standards 2 and 3 with cross-struts 4, 5 and 6 fastened thereto in any suitable manner and extending therebetween. The cross-strut 6 is in the form of a bed-plate for supporting bearing brackets 7 and 8 adjacent the opposite ends thereof. A mandrel 9 journaled in roller bearings on the brackets 7 and 8, see Figs. 1 and 10, has conical centers 10 and 11 thereon for engaging the ends of a hollow cylindrical work-piece, such as a printing roll R to be engraved. The bearing brackets 7 and 8 have removable caps 12 and 13 to adapt the mandrel 9 to be removed from the machine so that the work-piece R may be mounted thereon and removed therefrom. The work-piece R is usually mounted on the mandrel 9 at a location remote from the machine and the assembly mounted in the bearing brackets 7 and 8 to be held in place by the caps 12 and 13. The work-piece R is thus mounted in operative position on the machine for rotation about the axis of the mandrel 9.

Figure 10:
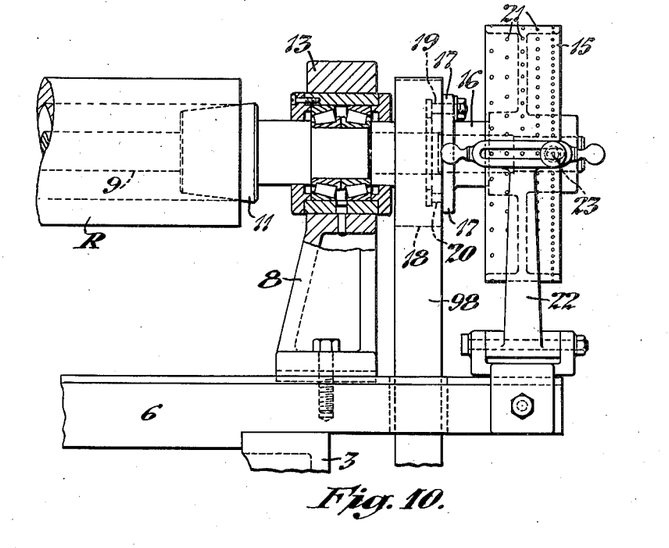
Fig. 10 is an enlarged part-sectional view showing the mandrel for supporting the cylindrical work-piece and the driving means for oscillating the work.

The mandrel 9 projects beyond the bearing bracket 8 at the right and has an adjusting wheel 15 keyed thereto, see Fig. 10. Also keyed to the projecting portion of the mandrel 9 between the adjusting wheel 15 and bearing bracket 8 is a sleeve 16 provided with a radial flange 17. Mounted on the mandrel 9 adjacent the flange 17 is a driving pulley 18. The pulley 18 is connected to the sleeve 16 for rotation therewith by means of a bolt 19 extending through the flange 17 with its head positioned in an annular T-shaped slot 20 in the side of the pulley. By tightening the bolt 19 the mandrel 9 may be connected for rotation with the driving pulley 18; and when the bolt is loosened the mandrel and work-piece may be freed for manual rotation with respect to the pulley to adjust the work-piece in angular relation thereto.

The adjusting wheel 15 has a series of suitable positioning holes 21 disposed around its periphery which correspond to particular angular positions of the work-piece R. A gauging arm 22 rockably mounted adjacent the wheel 15 has a laterally adjustable pin 23 at its end which is adapted to be engaged with any one of the particular holes in the adjusting wheel to set the work-piece R in any particular angular relationship and hold the mandrel 9 and work-piece accurately positioned while the bolt 19 is tightened.

*Tool-support*

Figures 2, 9:
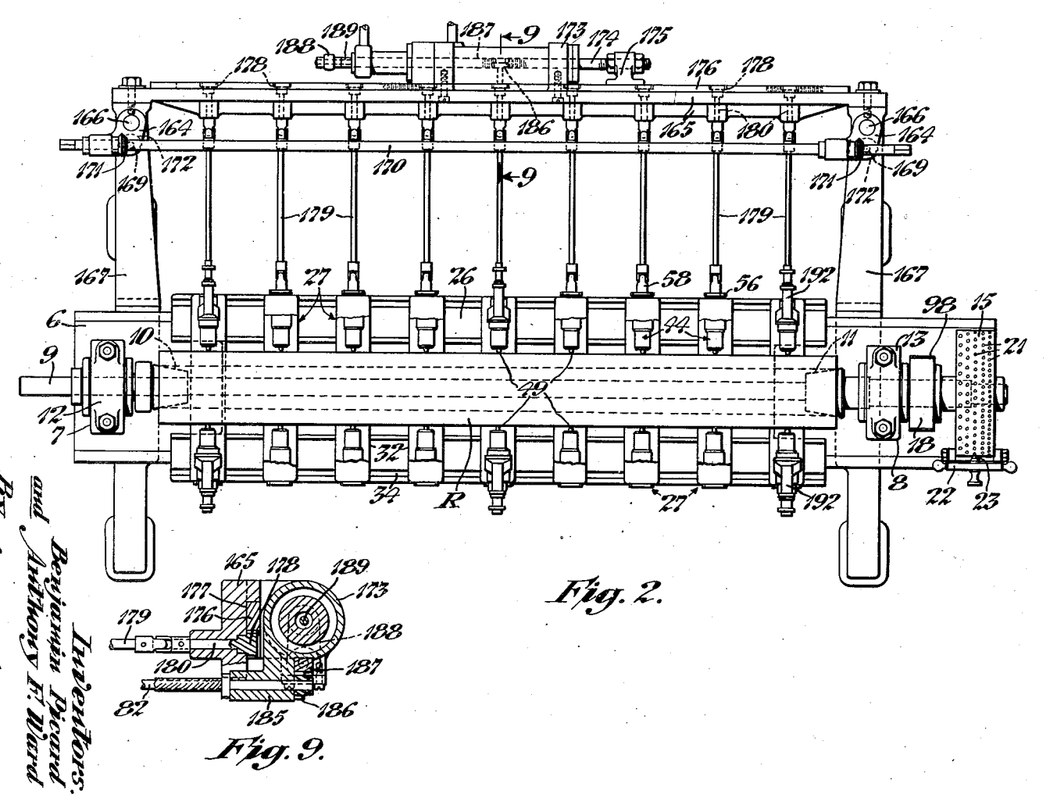
Fig. 2 is a plan view of the machine showing the relation of the cutting tools and cylindrical roll or work-piece to be engraved and the power-operated means for turning the tools to face in the direction of the cut being made.
Fig. 9 is a transverse sectional view on line 9—9 of Fig. 2 showing the means operated by the rotation of the stylus for controlling the operation of the power means for simultaneously turning all of the tools to cause them to face in the direction of the cuts being made.
Figure 5:
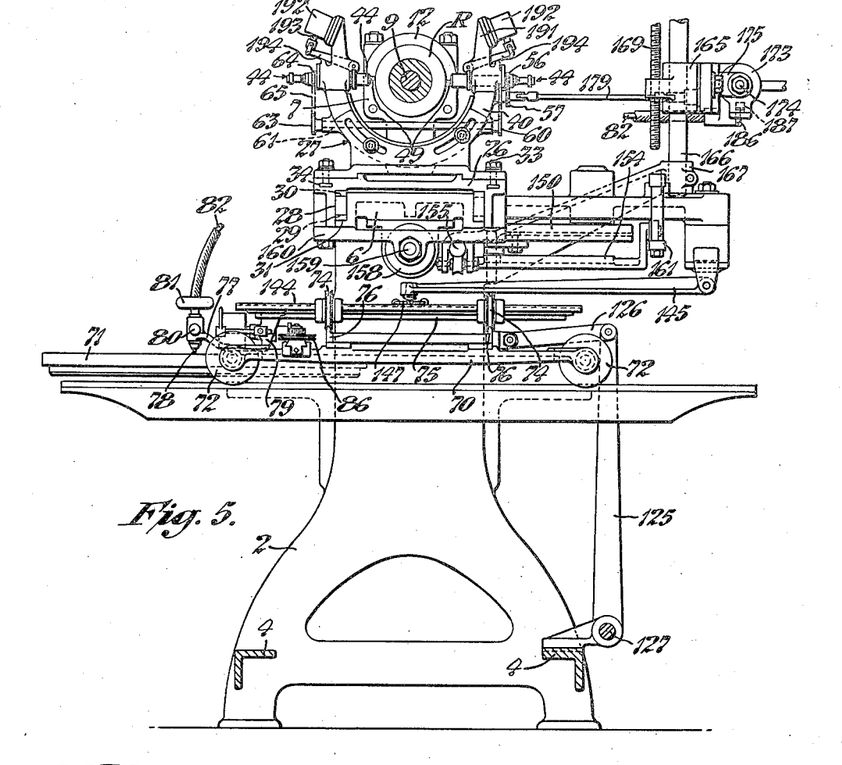
Fig. 5 is a transverse sectional view on line 5—5 of Fig. 1 showing the levers which are operated by the movement of the upper and lower carriages to control the separate power means.

A tool-support 26 slidably mounted on the bed-plate 6 carries a series of tool-posts 27 corresponding to the number of repeats of the design to be engraved on the cylindrical work-piece R longitudinally thereof, see Figs. 1 and 2. The tool-support 26 is of inverted U-shape in cross-section, see Fig. 5, with a top plate and depending sides which overlie the top and sides of the bed-plate 6. Recessed guideways 28 are provided in the sides of the bed-plate 6, see Figs. 1 and 5, for receiving rollers 29 which ride on tracks 30 and 31 formed on the tool-support 26 and bed-plate at the top and bottom of the recessed guideways. The tool-support 26 is thus mounted to roll on the rollers 29 longitudinally of the bed-plate 6 and the work-piece R.

Figure 8:
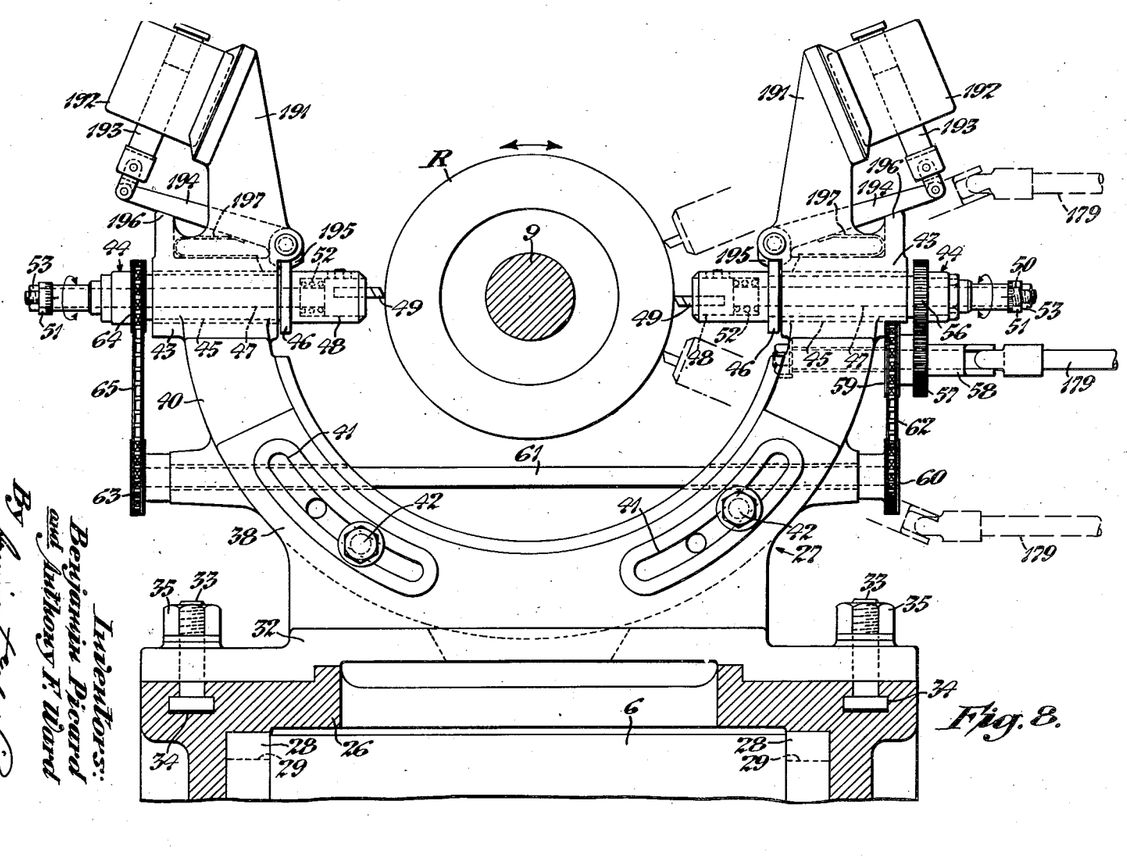
Fig. 8 is an enlarged transverse sectional view on line 8—8 of Fig. 1 showing the relationship of the cutting tools to the periphery of the cylindrical work-piece and the electromagnet-operating means for controlling the engagement of the cutting tools with the work-piece.

Referring to Fig. 8, each of the tool-posts 27 comprises a base 32 adapted to seat on the top of the tool-support 26 with a tongue-and-groove connection to prevent relative turning movement thereof. Bolts 33 on opposite sides of the base 32 of the tool-posts 27 have their heads positioned in T-shaped slots 34 which extend longitudinally throughout the length of the tool-support 26. Nuts 35 on the threaded ends of the bolts 33 are adapted to be tightened to clamp the tool-posts 27 to the tool-support 26; and by loosening the nuts 35 the tool-posts may be accurately adjusted with respect to each other longitudinally of the tool-support. An arcuate guideway 38 projects upwardly from the top of the base 32 of each tool-post for mounting a semicircular bracket or yoke 40. The guideway 38 is formed with arcuate slots 41 for receiving bolts 42 screwed into the yoke 40 to clamp the latter in various positions of adjustment on the base 32 as indicated by dash lines in Fig. 8. The opposite ends of the yoke 40 are in the form of bearings 43 for slidably and rotatively mounting tool-holders 44 at opposite sides of the work-piece R.

Each tool-holder 44 comprises a sleeve 45 slidable and rotatable in the bearing 43 and provided with a radial flange 46. Slidable longitudinally within the sleeve 45 is a spindle 47 carrying a head 48 at its outer end in which a cutting tool 49 is mounted. The spindle 47 has screw-threads 50 at its rearward end for receiving a nut 51 which abuts the end of a reduced portion of the sleeve 45. The periphery of the nut 51 is provided with a series of graduations which are adapted to register with a set mark on the reduced portion of the sleeve 45 whereby to accurately position the forward end of the cutting tool 49 with respect to the periphery of the work-piece R. A relatively stiff helical spring 52 positioned between the head 48 of the adjusting spindle 47 and an abutment within the sleeve 45 tends to hold the nut 51 in engagement with the end of the reduced portion of the sleeve 45 to properly position the cutting tool 49. A lock-nut 53 is provided on the threaded end of the adjusting spindle 47 for clamping the nut 51 in its position of adjustment. The cutting tool 49 may be of any suitable form, but preferably has a V-shaped end with a clearance rake extending rearwardly from the apex of the tool. By this form of construction each tool-post 27 mounts a pair of cutting tools 49 arranged at opposite sides of the work-piece R and adapted to be adjusted circumferentially and radially of the latter.

A gear 56 is provided on the sleeve 45 of the tool-holder 44 at the right-hand side of the tool-post 27, as viewed in Fig. 8, for turning the cutting tool 49 to face in the direction of the cut being made. The gear 56 meshes with a gear 57 on a driven shaft 58 for rotating the tool-holder 44 in either direction. The pair of tools 49 on each tool-post 27 are adapted to be turned in unison by driving means comprising a sprocket 59 on the driven shaft 58 connected to a sprocket 60 at one end of a shaft 61 by means of a chain 62. The shaft 61 extends across the yoke 40 and has a sprocket 63 at its opposite end for driving a sprocket 64 on the opposite tool-holder 44 by means of a chain 65. Thus any rotary movement of the driven shaft 58 for turning the cutting tool 49 at the right-hand side of the tool-post 27 will be transmitted through the shaft 61 to turn the tool at the left-hand side of the tool-post.

*Pattern tracing mechanism*

Figure 4:
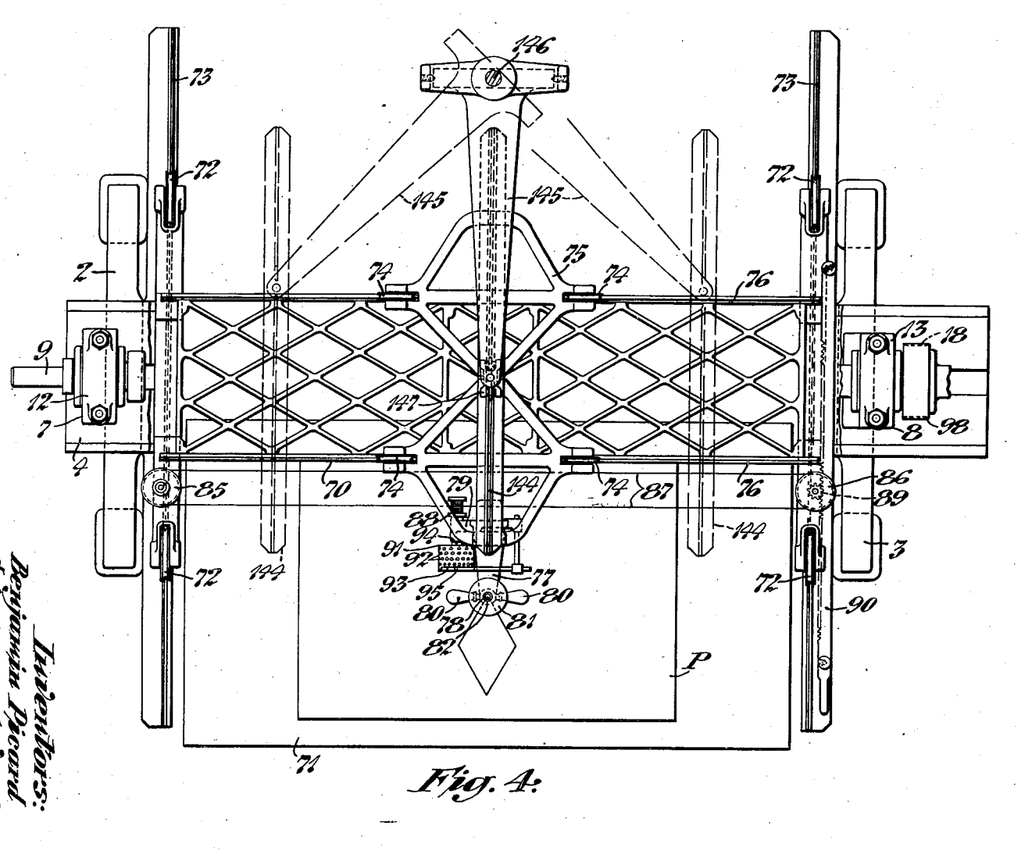
Fig. 4 is a sectional plan view on line 4—4 of Fig. 1 showing the arrangement of the upper and lower carriages for translating any movement of the stylus into two components of movement at right-angles to each other.

The tracing mechanism as illustrated in Figs. 1 and 4 is generally similar to that commonly used in etching machines and well understood by those skilled in the art. Suffice it to state herein that the tracing mechanism comprises a table 71 adjustably supported on the cross-strut 5 of the frame of the machine and adapted for fixedly holding the pattern P having the design to be reproduced. Overlying the table 71 is a carriage 70 mounted to move forwardly and rearwardly of the machine by means of rollers 72 at its ends which ride on tracks 73 fastened to the inside faces of the upright standards 2 and 3 of the frame. A second carriage 75 has rollers 74 adapted to ride on tracks 76 on the top of the lower carriage 70, the tracks 76 extending at right-angles to the tracks 73.

Mounted at the end of an arm 77 projecting forwardly from the upper carriage 75 is a stylus 78 for tracing the outline of the design to be reproduced. The arm 77 is pivoted to a depending bracket 79 on the upper carriage 75 to adapt the stylus 78 to be lifted off from the pattern. The stylus 78 is journaled in the arm 77 of the upper carriage 75 for rotation on its own axis to adapt it to face in the direction in which the stylus is moved in tracing the design on the pattern. To this end a pair of handles 80 project laterally from the stylus 78 and a hand-wheel 81 is provided above the handles. In operation the stylus 78 may be guided on the pattern and lifted therefrom either by the handles 80 or the handwheel 81.

With the carriages 70 and 75 arranged in the manner described above, movement of the stylus 78 in any direction is translated into component movements of the carriages in two directions at right-angles to each other. For example, if the stylus 78 is moved from the position shown in Fig. 4 along the line of the diamond shaped pattern P, first forwardly and to the right, the forward component of movement of the stylus will be transmitted through the carriage 75, rollers 74 and track 76 to move the lower carriage forwardly on its rollers 72 a distance equal to the forward movement of the stylus. Simultaneously, the lateral component of movement of the stylus 78 will cause the upper carriage 75 to move on its rollers 74 transversely of the lower carriage 70. Attached to the stylus 78 is a flexible cable 82 for transmitting rotary motion to the tools 49 as the stylus is turned on its axis to face in the direction of the lines of the pattern P being traced.

A suitable control and indexing mechanism is illustrated in Fig. 4 for adapting the stylus to be moved obliquely of the pattern P and with a predetermined spacing between its strokes when ground-work is to be engraved. The control mechanism comprises a pair of pulleys 85 and 86 mounted at opposite ends of the lower carriage 70 with a continuous belt or wire band 87 extending around the pulleys and attached at its ends to a spool 88 mounted on a shaft 94 rotatable on the stylus-support bracket 79. A pinion gear 89 fast on the pulley 86 meshes with a rack 90 mounted on the standard 3 and extending longitudinally of the lower end of the lower carriage 70. Mounted on the opposite end of the shaft 94 from the spool 88 is a drum 91 having a series of rows of holes 92 therein adapted to be engaged by a pin 95 depending from an arm 93 pivotally mounted on the bracket 79 for the stylus support or arm 77, see Fig. 1. When ground-work is to be engraved the operator turns the drum 91 after each cut a distance equal to the spacing between adjacent holes 92 in a particular row which, in turn, will cause the spool 88 to be rotated to move the band 87. Such movement of the band 87 will rotate the pulley 86 to travel the pinion 89 on the rack 90 to index the carriages 70 and 75 and stylus 78 forwardly a distance equal to the desired spacing between adjacent cuts. After each adjustment of the drum 91 the pin 95 on the arm 93 is inserted in the appropriate hole 92 and the stylus 81 thus will be adjusted to properly space its strokes across the design of the pattern P. Upon movement of the stylus 78 forwardly the gear 89 will travel along the rack 90 to rotate the pulley 86 and move the band 87 longitudinally. When the spool 88 is locked against rotation by the engagement of the pin 95 on the arm 93 with the drum 91 the movement of the band 87 will act to shift the stylus and upper carriage 75 sidewise as it moves forwardly. It will be understood that each row of holes 92 corresponds with a ground-work of a particular number of lines per inch and that when an outline only is being traced the rack 90 is swung outwardly away from the pinion 89 so that the stylus may be moved freely in any direction. To provide for disconnection of the rack 90 from the pinion 89 the rack is pivoted at its rearward end and held by a catch at its opposite end to adapt it to swing to one side; this being the usual arrangement.

*Power means for oscillating the work-piece*

Figure 3:
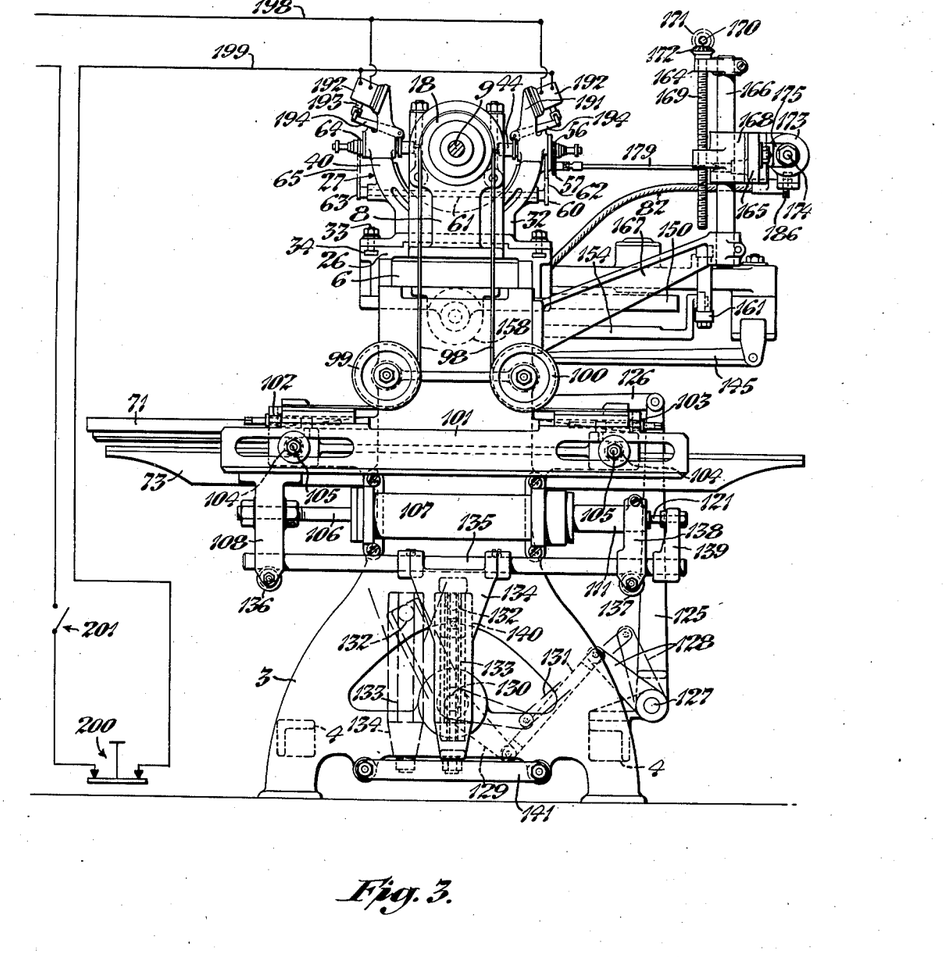
Fig. 3 is an end elevational view of the machine showing the power-operated means for oscillating the work-piece with respect to the cutting tools to engrave around the periphery of the work-piece.

The forward or rearward component of movement of the stylus 78 while tracing the outline of a design on the pattern P is transmitted from the lower carriage 70 through motion-reducing mechanism to control power means connected to oscillate the cylindrical work-piece R with respect to the cutting tools 49. As shown in Figs. 1 and 3 the power-operated driving means for oscillating the cylindrical work-piece R comprises a belt or band 98 extending around the periphery of the pulley 18 on the mandrel 9 and around two loose pulleys 99 and 100 mounted on the upright standard 3 of the machine frame below the mandrel. The terminal portions of the band 98 extend laterally from the pulleys 99 and 100 with their ends attached to a slide 101 by adjustable connecting means 102 and 103 thereon. The slide 101 is suitably guided on rollers 104 rotatably mounted on studs 105 screwed into blocks formed on the side of the standard 3, see Figs. 1 and 3. The slide 101 has a depending arm 108 connected to the piston-rod 106 of power means 107 attached to the side of the standard 1. Movement of the piston-rod 106 in either direction will move the slide 101 therewith and through the means of the flexible band 98 will turn the cylindrical work-piece R on its axis with respect to the cutting tools 49.

Although the power means 107 herein illustrated is in the form of a hydraulically operated servo-motor it is to be understood that any other suitable type of power unit may be used to fall within the scope of the present invention. The servo-motor 107 as illustrated in detail in Fig. 11 comprises a cylinder 109 having heads at its opposite ends and a reciprocable piston 110 in the cylinder connected at one end to the piston-rod 106 extending through one of the heads. A hollow guiding sleeve 111 connected to the opposite end of the piston 110 projects outwardly through the opposite head of the cylinder 109. Connected to the cylinder 109 is a conduit 112 adapted to supply fluid under pressure to the annular chamber 113 between the sleeve 111 and the cylinder 109. The piston 110 has an inlet port 114 communicating with the chamber 113 and an axial bore 115 in the piston. A second or intermediate port 116 in the piston communicates with the bore 115 in spaced relation to the inlet port 114 and extends to the right-hand end of the piston, as viewed in Fig. 11. Another exhaust port 117 communicates with the bore 115 in spaced relation to the port 116 and leads back to the center of the hollow sleeve 111. A flexible exhaust conduit 118 connected to the sleeve 111 adjacent its outer end communicates with the hollow center thereof. Within the bore 115 of the piston 110 is a piston-type valve 119 having a central reduced or ported portion 120 adapted to slightly overlap the inlet and exhaust ports 114 and 117. A control rod 121 connected to the piston-valve 119 extends outwardly through the hollow sleeve 111 as shown in Fig. 11.

Figure 11:
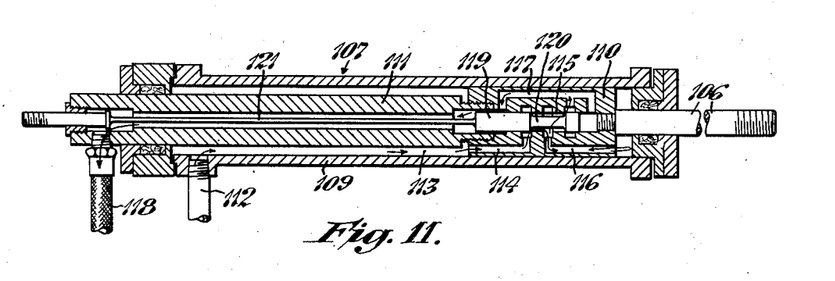
Fig. 11 is a longitudinal sectional view through one of the servo-motors showing the freely movable control valve and power-operated piston for following the motion of the control valve.

When the piston-valve 119 is in the position shown in Fig. 11 the pressure fluid in the chamber 113 will pass through the inlet port 114 into the bore 115 in the piston and escape through the exhaust port 117 to the hollow sleeve 111 to exhaust through the flexible conduit 118. Upon movement of the control rod 121 to the left, as viewed in Fig. 11, the piston-valve 119 will be moved to open the inlet port 114 and close the exhaust port 117 to a further extent so that the pressure fluid will pass through the intermediate port 116 to the end of the piston 110. The pressure fluid acting against the right-hand end of the piston 110, as shown in Fig. 11, will move the latter and the piston-rod 106 in the same direction or to the left and to the same extent as the movement of the control rod. The slide 101, see Fig. 3, being connected to the piston 110 will be moved to the right as viewed in this latter view showing the motor in reversed position. Due to the continuous pressure of the fluid in the motor the piston 110 will be operated substantially simultaneously with the movement of the control rod 121.

Upon movement of the control rod 121 to the right, as viewed in Fig. 11, the piston-valve 119 will close the inlet port 114 and open the exhaust port 117 so that the pressure fluid acting against the left-hand end of the piston 110 between the sleeve 111 and wall of the cylinder 109 will move the piston 110 to the right. Thus, movement of the control rod 121 in either direction will cause a corresponding movement of the piston 110 which, acting through the slide 101, and band 98 will transmit correlated rotary movement to the cylindrical work-piece R. Moreover, due to the balanced pressures acting on the piston-valve 119 the latter may be moved freely by the control rod 121 and the piston-rod 106 will follow the movement of the control rod with a force corresponding to the pressure of the fluid and the area of the piston acted upon by the fluid.

The movement of the control rod 121 of the power-operating servo-motor 107 is controlled by the forward and rearward movement of the carriage 70 operating through motion-reducing mechanism illustrated in Figs. 1 and 3. The lower carriage 70 is connected to one end of a lever 125 by means of a link 126, see Fig. 5. The lever 125 is fast on a rock-shaft 127 suitably journaled on the frame of the machine and having a crank-arm 128. The crank-arm 128, in turn, is connected by a link 131 to a crank-arm 129 extending from a rock-shaft 130 journaled in the standard 3 of the machine frame. A crank-arm 140 at the opposite end of the rock-shaft 130 carries a pin 132 which is adapted to slide in a slot 133 in a bracket 134 fastened to and depending from a horizontal push rod 135. The pin 132 is adjustable longitudinally of the crank-arm 140 to alter the effective length of the latter and the lower end of the bracket 134 is held against lateral displacement by a suitable guideway 141 at the bottom of the standard 3. The push rod 135 is mounted on a roller 136 on the arm 108 depending from the slide 101 and a roller 137 on an arm 138 depending from the sleeve 111 of the servo-motor 107. An arm 139 at the outer end of the push rod 135 connects the latter to the control rod 121 of the servo-motor 107. By this form of construction any movement of the stylus 78 forwardly or rearwardly across the pattern P of the design to be traced will be transmitted through the lower carriage 70 and the motion-reducing linkage to operate the push rod 121 of the servo-motor 107 with a correspondingly proportional movement.

*Power means for moving the tool-support*

Figure 6:
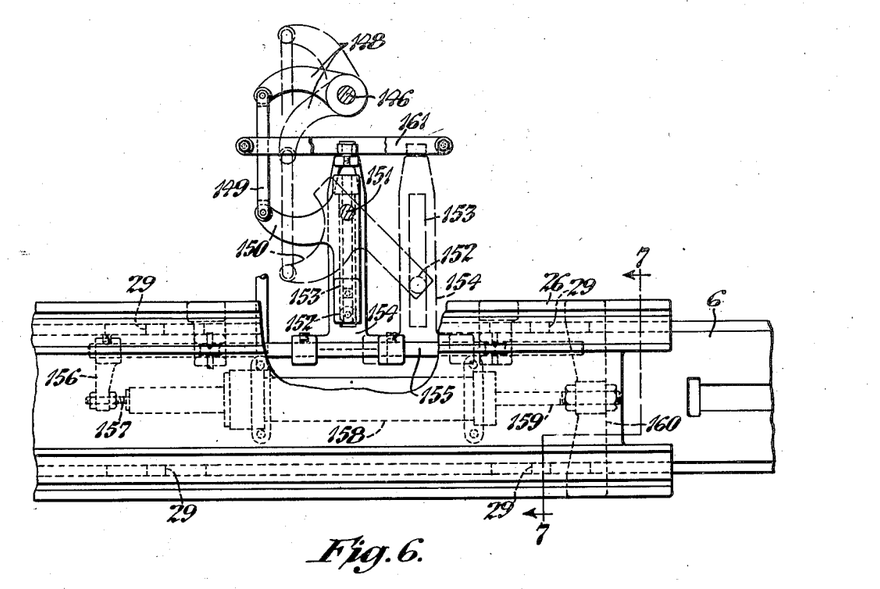
Fig. 6 is a detailed plan view showing the motion-reducing linkage which is operated by the lever connected to the upper carriage to control the power means for relatively moving the cutting tools and work-piece longitudinally.
Figure 7:
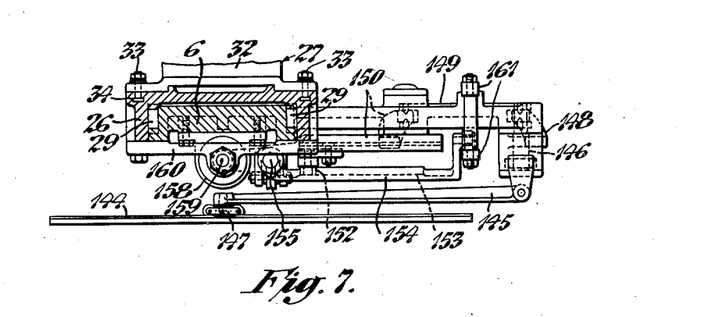
Fig. 7 is a transverse sectional view taken generally on line 7—7 of Fig. 6 and showing the arrangement by which the tool-support is slidably mounted on its bed.

The tool-support 26 is adapted to be moved longitudinally of the work-piece R during any lateral movement of the stylus 78 by means of power-operated driving means similar to that described above for oscillating the work-piece. As shown in the plan view, Fig. 4, the upper carriage 75 has a centrally positioned grooved track 144 extending at right-angles to the tracks 76 on the lower carriage 70. Overlying the upper carriage 75 is a lever 145 suitably connected to a vertical shaft 146 at its rearward end and having a depending truck 147 swiveled thereto at its forward end with a pair of wheels mounted thereon to adapt them to ride in the track 144, see Fig. 5. Lateral movement of the carriage 75 will rock the lever 145 and shaft 146 to the positions indicated by dash lines in Fig. 4. Referring to Figs. 6 and 7, a crank-arm 148 fastened to the shaft 146 is connected by a link 149 to one arm of a bell-crank lever 150 to rock the latter on its pivot 151 to the positions indicated by dash lines in Fig. 6. A pin 152, preferably mounted for adjustment longitudinally of the opposite arm of the bell-crank lever 150, engages in a slot 153 in a bracket 154 mounted fast on a push rod 155, the outer end of the bracket 154 being supported on a suitable guide track 161. The push-rod 155 is connected by an arm 156 to the control rod 157 of a servo-motor 158 which may be of identical construction with that of the servo-motor 107 previously described.

As shown in Fig. 1 the servo-motor 158 is mounted on the under side of the bed-plate 6 and has its piston-rod 159 connected to an arm 160 depending from the tool-support 26. The motion-reducing mechanism connecting the upper carriage 75 to operate the control rod 157 is adapted to reduce the motion in the same proportion as the connecting linkage between the lower carriage 70 and the servo-motor 107 so that the longitudinal movement of the tool-support with respect to the work-piece R will correspond to the oscillatory movement of the work-piece R to accurately engrave the periphery of the latter with the design of the pattern P as it is traced by the stylus 78.

*Power means for rotating the cutting tools*

The several cutting tools 49 are turned simultaneously to face in the direction of the cut being made in accordance with the rotation of the stylus 78 as it traces the design on the pattern P. The driving means for rotating the cutting tools 49 is mounted on a rail 165 adapted for vertical adjustment on rods 166, see Figs. 2, 3 and 9. The rods 166 project upwardly from brackets 167 attached to the rearward sides of the standards 2 and 3 of the machine frame. Bearings 168 on the rail 165 embrace the rods 166 to adapt it to be raised and lowered by means of screw-shafts 169 rotatably mounted in brackets 164 at the upper ends of the rods 166 and extending through threaded holes in the rail. The screw-shafts 169 are connected for simultaneous rotation by means of a transverse shaft 170 having bevel-gears 171 thereon which mesh with bevel-gears 172 on the ends of the shafts. The shaft 170 may be turned by means of a crank, not shown herein, fitted to the squared end of the shaft.

Fixedly mounted on the rearward side of the rail 165 is a servo-motor 173 of a construction identical with that of the servo-motor 107 previously described in detail. The piston-rod 174 of the servo-motor 173 has an arm 175 at its end attached to a rack 176 extending longitudinally of the rail 165. The rack 176 is mounted in a suitable guideway 177 in the rail 165, see Fig. 9, and meshes with a series of pinion gears 178 mounted on shafts 180 journaled in the rail, the number of shafts corresponding to the number of tool-posts 27. The pinion shafts 180 are connected to the driven shafts 58 on the tool-posts 27 by means of horizontal shafts 179 having universal joints at both ends. Consequently, the sliding movement of the rack 176 in either direction will act to rotate the cutting tools 49; it being understood that the rail 165 may be raised or lowered by the screw-shafts 169 to locate it in proper relation to the tool-post yoke 40 in its different positions of angular adjustment, indicated by dash lines in Fig. 8.

The operation of the servo-motor 173 is controlled from the rotation of the stylus 78 by means of the flexible cable 82, referred to previously, connected thereto. The flexible cable 82 extends upwardly and rearwardly from the stylus 78 to the rail 165, see Figs. 1 and 3, and has its end journaled in a depending portion 185 of the cylinder of the servo-motor 173 as shown in Fig. 9. A pinion 186 fast on the end of the flexible cable 82 meshes with a rack 187 slidably guided in the depending portion 185 of the cylinder of the servo-motor 173. The rack 187 extends longitudinally of the servo-motor 173 and has an arm 188 at its end, see Figs. 2 and 9, connected to the control rod 189 of the servo-motor. By these connections the rotation of the stylus 78 on its axis will be transmitted through the flexible cable 82 to slide the rack 187 and control rod 189 of the servo-motor 173 to cause the piston-rod 174 to slide the tool-operating rack 176. Movement of the rack 176 in either direction will rotate the pinion gears 178, shafts 180 and connected shafts 179 extending toward the tool-posts 27. The shafts 179 thus will act to rotate the shafts 58 and gears 56 and 57 to turn the cutting tools 49 at the right-hand side of the work-piece 49, as viewed in Fig. 8, to face them in the direction of the cut being made. Rotation of the driven shafts 58 will be transmitted through the sprockets 59 and 60, chains 62, shafts 61, sprockets 63 and 64 and chains 65 to simultaneously rotate the cutting tools 49 at the left-hand side of the work-piece R, as viewed in Fig. 8.

*Mechanism for controlling the position of the cutting tools*

The several cutting tools 49 are adapted to be engaged in unison with the work-piece R or to be withdrawn simultaneously from engagement therewith. To this end the yoke 40 of each tool-post 27 mounts a pair of electromagnets 192 supported on brackets 191 at its opposite ends and each electromagnet is provided with an armature 193 adapted to be actuated to the position shown in Fig. 8 when the electromagnet is energized. It will be understood that an electromagnet 192 is provided for each cutting tool 49 and that all of the several electromagnets 192 are electrically connected in parallel to adapt them to be energized simultaneously. The armature 193 of each electromagnet 192 is linked to the end of one arm of a bell-crank lever 194 while the opposite arm is forked at 195 to embrace the flange 46 on its respective tool-holder 44. The outward movement of the armature 193 is limited by the engagement of the bell-crank lever 194 with a stop 196 on the tool-post bearing 43. When the bell-crank lever 194 is in engagement with the stop 196 the tool-holder 44 will have been moved to a position to engage the cutting tool 49 with the periphery of the work-piece R and cause it to cut into the surface thereof to a predetermined depth as controlled by the adjustment of the micrometer nut 51. When the electromagnet 192 is deenergized a spring 197, acting between the tool-post bearing 43 and the bell-crank lever 194, will rock the latter in a direction to withdraw the tool-holder 44 and disengage the cutting tool 49 from the surface of the work-piece R.

Referring to Fig. 3, the energization of the electromagnets 192 is controlled by an electric circuit having one line conductor 198 connected to one terminal of each electromagnet 192 and the other line conductor 199 connected to the other terminal of each electromagnet. The conductor 199 includes a switch 200 of any suitable construction which may be operated manually to energize the electromagnets to move the tools 49 into engagement with the periphery of the work-piece R. A line switch 201 also may be provided in the conductor 199 for opening the circuit to the electromagnets when the machine is not in use. Preferably the switch 200 is operated by a suitable foot-treadle, not herein shown, which is normally operative to close the switch 200 to maintain the electromagnets energized and opens the switch when depressed. One form of the invention having now been described in detail the mode of operation of the machine is as next explained.

*Mode of operation*

The machine is prepared for an engraving operation by applying a suitable work-piece or printing roll R on the mandrel 9 and mounting the mandrel for rotation in the bearing brackets 7 and 8. The range of action of the motion-reducing connecting means between the stylus 78 and the servo-motors 107 and 158 is then regulated by adjusting the pin 132 on the arm 140, see Figs. 1 and 3, and the pin 152 on the arm of the bell-crank lever 150, see Figs. 6 and 7, to produce equal reductions of the movement of the stylus in two directions so as to accurately reproduce in miniature the design traced by the stylus. The yokes 40 are adjusted on the tool-posts 27 to properly position the cutting tools 49 circumferentially of the work-piece and the tool-posts are adjusted along the tool-support 26 in proper spaced relation to each other longitudinally of the work-piece R to produce the desired number of repeats in the design to engrave them in series. The rail 165 at the rear of the work-piece R is adjusted vertically by turning the shaft 170 to position the drive shafts 180 on the rail approximately in line with the driven shafts 58 on the tool-posts 27. The tool-holders 44 are also adjusted radially of the work-piece R by turning the adjusting nuts 51 so that all the cutting tools 49 will incise the surface of the work-piece to the same depth.

The pattern P with the design to be traced may be located in proper position on the table 11 and tacked or otherwise suitably fastened in place thereon. To properly position the pattern P the stylus 78 is moved to locate the cutting tools 49 in their correct position with respect to the work-piece R corresponding to a starting point on the design to be engraved. The corresponding point of the pattern P is then located under the stylus 78 with its rearward edge in parallel relation to suitable lines usually marked on the table and extending parallel to the axis of the work-piece R. The pattern P is then fastened to the table 71 and the machine is ready for operation.

The operator of the machine first closes the switch 200, see Fig. 3, to cause the plurality of cutting tools 49 to be moved into cutting engagement with the periphery of the work-piece R. The contour of the design is traced by moving the stylus 78 manually to follow the outline thereof as the operator of the machine turns the stylus on its axis to cause it to face in the direction of the lines. For example, if a design in the shape of a diamond is to be traced, see Fig. 4, the operator of the machine moves the stylus 78 in a straight line forwardly and to the right from the rearward apex of the diamond-pattern with the point of the stylus facing in the direction of the line. As the stylus 78 is moved along the diagonal line of the design on the pattern P its forward component of movement is transmitted from the upper carriage 75 connected thereto, see Fig. 5, to the lower carriage 70 by the lateral engagement of the rollers 74 on the upper carriage with the tracks 76 on the lower carriage. The forward movement of the lower carriage 70 as its rollers 72 travel on the tracks 73 is transmitted through the motion-reducing mechanism comprising the link 126 connecting the carriage to the lever 125, see Figs. 1 and 3, to rock the rock-shaft 127 on which the lever is mounted in counterclockwise direction as viewed in Fig. 3. Rocking movement of the shaft 127 in counterclockwise direction will rock the crank-arm 128 thereon from the position indicated by dash lines to that shown in full lines in Fig. 3. The crank-arm 128 thus will act through the link 131 to rock the crank-arm 129 and rock-shaft 130 to move the crank-arm 140 from the position indicated by dash lines to the position illustrated in full lines in Fig. 3. The pin 132 on the crank-arm 140, acting against the sides of the slot 133 in the bracket 134, will move the latter and the push rod 135 connected thereto to the right as viewed in Fig. 3. Movement of the push rod 135 to the right will move the control rod 121 in the same direction and the latter will shift the piston-valve 119 to close the exhaust port 117 in the servo-motor 107. Consequently, power will be applied to the piston 110 to move its rod 106 to the right. The slide 101 connected to the piston-rod 106 thus will be moved to the right to cause the band 98 to rotate the pulley 18 in clockwise direction, as viewed in Fig. 3, and with it the work-piece R.

Simultaneously with the clockwise rotary movement of the work-piece R the lateral or sidewise component of movement of the stylus 78 will be transmitted to the upper carriage 75 connected thereto to move it to the right, as viewed in Figs. 1 and 4, with the upper carriage traveling on the tracks 76 of the lower carriage 70. This lastmentioned movement of the carriage 75 to the right will be transmitted to the lever arm 145, see Fig. 4, by the engagement of its depending truck 147 with the track 144 on the upper carriage 75. The rocking movement of the lever arm 145 will rock the shaft 146 on which it is mounted, see Figs. 6 and 7, and the latter acting through the crank-arm 148 and link 149 will rock the bell-crank lever 150 on its pivot 151. The engagement of the pin 152 on the lever 150 with the sides of the slot 153 in the bracket 154 will act to move the latter from the position illustrated in full line to the position indicated by dash lines in Fig. 6. Movement of the bracket 154 to the right as viewed in Fig. 6 will move the push rod 155 therewith which, in turn, will move the control rod 157 of the servo-motor 158 to the right. Movement of the control rod 157 to the right will apply power to the piston in the motor 158 to move the piston-rod 159 and slide the tool-support 26 to the right on the bed-plate 6.

The operator of the machine turns the stylus 78 on its axis to face in the direction of the line being traced and the position of the stylus is transmitted through the flexible cable 82 to the pinion gear 186, see Figs. 1, 2 and 9, to slide the rack 187 longitudinally. Movement of the rack 187 in either direction will act to move the control rod 189 of the servo-motor 173 which, acting through its piston-rod 174, will slide the second rack 176. Movement of the rack 176 will cause simultaneous rotation of the plurality of pinion gears 178 and drive shafts 180 which, acting through the connecting shafts 179 will rotate the driven shafts 58 on the tool-posts 27. Rotation of the driven shaft 58 on each tool-post 27 will rotate the tool-holder 44 at the right-hand side of the tool-post as viewed in Fig. 8 by means of the intermeshing gears 56 and 57. The driving means for rotating the tool-holders 44 are so constructed and arranged that rotation of the stylus 78 through 360° will cause a corresponding 360° rotation of the tool-holders. Consequently, the position of the cutting tools 49 on the tool-holders 44 at the right-hand side of the tool-post 27, as viewed in Fig. 8, will correspond at all times with the position of the stylus 78 so that the cutting tools will face in the direction of the cut being made. The cutting tools 49 at the left-hand side of the work-piece R are in reverse position from those at the right-hand side of the work-piece to adapt them to cut but will be turned simultaneously therewith by the driven shafts 58 operating through the chains 62, shafts 61 and chains 65, see Fig. 8. Thus, the plurality of cutting tools 49 will be adjusted in unison by the rotation of the stylus 78 on its axis to face in the direction of the cut being made.

Figure 12:
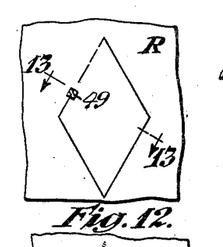
Fig. 12 is a diagrammatic view of the outline of a design cut in the surface of the work-piece.
Figure 13:
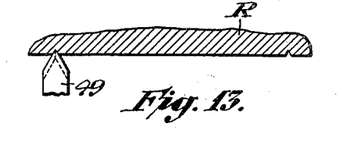
Fig. 13 is an enlarged transverse sectional view taken on line 13—13 of Fig. 12 showing the V-shaped groove cut in the work by the cutting tool.

As all the several cutting tools 49 on the tool-posts 27 are maintained in engagement with the periphery of the work-piece R by the action of the solenoids 192 the simultaneous movement of the work-piece and tool-support 26, corresponding to the movement of the stylus 78, will cause a series of V-shaped grooves to be incised in the surface of the work-piece, see Figs. 12 and 13, corresponding in direction and length to the diagonal or other lines on the pattern P. The operator of the machine continues to follow the outline of the design to be traced with the stylus 78 and the latter, acting through the motion-reducing mechanism, as described above, will act to control the power-operated servo-motors 107 and 158 to oscillate the work-piece R and slide the tool-support 26 to reproduce the contour of the design. As the control rods 121 and 157 of the servo-motors 107 and 158 and piston-valves 119 connected thereto are freely movable the resistance caused by the cutting engagement of the plurality of tools 49 with the work-piece R will not be transmitted back to the stylus 78 so that the latter may be moved freely to trace the outline of the design.

After the outline of the design has been traced or when it is desired to move the stylus 78 to a new position the switch 200 may be opened, see Fig. 3, to deenergize the electromagnets 192. The springs 197, see Fig. 8, will then operate on the bell-crank levers 194 mounted on the yokes 40 of the plurality of tool-posts 27 to retract the tool-holders 44 and withdraw the cutting tools 49 from engagement with the periphery of the work-piece R. The stylus 78 then may be moved to any position without causing the tools to cut into the periphery of the work-piece R.

Figure 14:
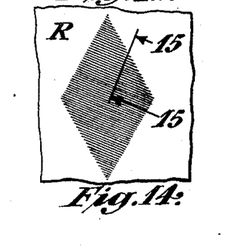
Fig. 14 is a view similar to Fig. 12 showing a ground-work design cut in the surface of the work-piece.
Figure 15:
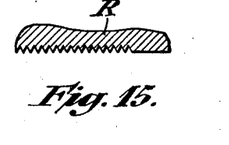
Fig. 15 is an enlarged sectional view taken on line 15—15 of Fig. 14 showing the series of V-shaped grooves cut in the surface of the work to form the ground-work.

When a design to be engraved has both an outline and ground-work it is the usual practice to first engrave the outline on the work-piece R, see Figs. 12 and 13, and thereafter engrave the ground-work, see Figs. 14 and 15. In some designs such as polka dots the entire engraving operation is ground-work. Although the ground-work pattern is illustrated in Figs. 14 and 15 as having the same diamond shape as the design traced in outline, it is to be understood that with the present machine it is not necessary to engrave the outline of the ground-work on the work-piece. The ground-work may comprise a plurality of diagonal lines arranged in closely adjacent parallel relationship. To adjust the machine for engraving the ground-work the rack 90 is swung into position to mesh its teeth with the pinion gear 89 on the pulley 86. As previously explained, any forward movement of the stylus 78 therefore will be translated into diagonal movement with respect to the pattern P due to the rotary movement of the gear 89 on the rack 90 and the connection of the pulley 86 with the stylus-supporting arm 79 by means of the band 87. The operator may start at the upper rearward portion of the ground-work design, such as the diamond illustrated in Fig. 4, and draw the stylus forwardly and to the right as its lateral motion is controlled by the band 87, with its stroke terminating at the opposite side of the design. The cutting tools 49 are then withdrawn by opening the switch 200 and the stylus brought back to its initial position. The operator next lifts the arm 93 to withdraw the pin 95 from the drum 91 and then turns the latter a distance equal to the spacing between the adjacent holes 92 of a particular row. Rotation of the drum 91 and spool 88 connected thereto will wind up the band 87 at one side and unwind it from the opposite side to rotate the pulley 86 and pinion 89 which rolls on the rack 90. By this manual adjustment the lower carriage 70 and upper carriage 75 will be advanced a distance corresponding to the required spacing between the cuts to be made. The operator inserts the pin 95 on the arm 93 in the selected hole 92 on the drum 91 and closes the switch 200 to cause the tools 49 to engage the periphery of the work. The stylus is then moved forwardly again to make the next cut of the ground-work and the same operations are repeated until the whole area selected for the ground has been covered. To produce ground-work having any predetermined number of lines per inch a particular row of holes 92 in the periphery of the drum 91 is selected to space the line cuts properly.

After a design pattern has been engraved on the work-piece R and it is desired to repeat the design circumferentially thereof the bolt 19, see Fig. 10, is loosened to permit the mandrel 9 to be rotated with respect to the pulley 18. The mandrel 9 may be turned by the adjusting wheel 15 which has the various positioning holes 21 in its periphery corresponding to particular angular relationships between the work-piece and the tools. If a particular design cut on the work-piece R covers 45° of arc on its circumference the stylus 78 is brought back to first position before the bolt 19 is loosened, for example the upper left-hand corner of the work, and the pin 23 on the arm 22, see Fig. 10, is inserted in a corresponding hole 21 in the adjusting wheel 15. After the bolt 19 is loosened the pin 23 is withdrawn and the adjusting wheel 15 turned to another hole corresponding to 45° of the arc, after which movement the pin is again inserted in a corresponding hole. The mandrel 9 and adjusting wheel 15 then will be held by the pin 21 while the bolt 19 is tightened. The machine is then ready to start another engraving operation at the proper circumferential location on the work-piece so that it will register with the previous engraving with the repeats in the design joined to each other.

It will be observed from the foregoing specification that the present invention provides an engraving machine adapted to engrave directly on the surface of the work-piece as the design of the pattern is traced by a stylus. It will be observed also that the present invention provides power means having freely movable control members operated by the stylus, and power-operated elements for relatively moving the work-piece and cutting tools so that the resistance of the cutting tools is not transmitted back to the stylus. It will be observed still further that the invention provides a construction in which the cutting tools are continuously turned to face in the direction of the cut being made to adapt the design to be cut directly in the surface of the work-piece.

While the machine of the present invention is herein shown and described as particularly adapted to engrave on the periphery of cylindrical rolls, it is to be understood that the machine may be adapted for engraving flat surfaces or surfaces of other shapes by mounting the tools and work-piece for relative movement in the same plane.

While only one form of the invention is herein illustrated and described, it is to be understood that modifications may be made in the construction and arrangement of its parts without departing from the spirit or scope of the invention. Therefore, without limiting ourselves in this respect, we claim:

1. In a machine of the type indicated, means for supporting a cylindrical work-piece for oscillation about its longitudinal axis, a cutting tool for engraving a design on the periphery of the cylindrical work-piece, power-operated means for oscillating the cylindrical work-piece relatively of the cutting tool, a second power-operated means for moving the cutting tool longitudinally of the work-piece, a manually-operable stylus for tracing a design on a pattern, and means actuated by the stylus to control the operation of the separate power-operated means during movement thereof in right-angular directions whereby to engrave a reproduction of the design traced by the stylus without resistance to the movement of the latter.

2. In a machine of the type indicated, means for supporting a cylindrical work-piece for oscillation about its longitudinal axis, means for supporting a plurality of cutting tools to simultaneously engrave a plurality of designs on the periphery of the work-piece, power-operated means for oscillating the work-piece relatively of the cutting tools, power-operated means for moving the tool-supporting means longitudinally of the work-piece, a manually-operable stylus for tracing the design on a pattern, and means actuated by the stylus to control the operation of the separate power-operated means during their movement in right-angular directions whereby to reproduce corresponding relative movement of the work-piece and tool-supporting means.

3. In a machine of the type indicated, a cutting tool for engraving a design on a work-piece, power-operated means for relatively moving the cutting tool and work-piece in two directions at right-angles to each other, a manually-operable stylus for tracing the design on a pattern, means actuated by the stylus to control the power-operated means to relatively move the work-piece and cutting tool to engrave the design traced by the stylus, means for mounting the cutting tool for rotation to face in the direction of the cut being made, and means operable during an engraving operation for turning the cutting tool to face in the direction in which the tool is being moved.

4. In a machine of the type indicated, a cutting tool for cutting a groove in a work-piece, power-operated means for relatively moving the cutting tool and work-piece in two directions at right-angles to each other, a stylus for tracing a design on a pattern, means actuated by the stylus to control the power-operated means to relatively move the work-piece and cutting tool to engrave the design traced by the stylus, and means actuated by the stylus for turning the cutting tool to face in the direction in which the cut is being made in the work-piece.

5. In a machine of the type indicated, a cutting tool for cutting a V-shaped groove in the work-piece, a stylus for tracing a design on a pattern, means operated by the movement of the stylus for relatively moving the tool and work-piece to engrave the design traced by the stylus, said stylus being rotatable to face in the direction of the lines of the design being traced, and power-operated means responsive to the rotation of the stylus for turning the cutting tool to cause the latter to face in the direction in which the cut is being made in the work-piece.

6. In a machine of the type indicated, a cutting tool for engraving a design on a work-piece, power-operated means for relatively moving the cutting tool and work-piece in two directions at right-angles to each other, a stylus for tracing a design on a pattern, means actuated by the movement of the stylus to control the power-operated means to relatively move the work-piece and cutting tool to engrave a reproduction of the design, said stylus being rotatable to face in the direction of the lines of the design being traced, and power-operated means responsive to the rotation of the stylus for turning the cutting tool to face in the direction in which the cut is being made.

7. In a machine of the type indicated, a cutting tool for engraving a design on a work-piece, power-operated means for relatively moving the cutting tool and work-piece in one direction, a second power-operated means for relatively moving the cutting tool and work-piece in a direction at right-angles to the direction of movement by the first-mentioned power-operated means, a stylus for tracing the design, means actuated by movement of the stylus to control the operation of the separate power-operated means whereby to engrave the work-piece with a reproduction of the design, said stylus being rotatable to face in the direction of the lines of the design being traced, and power-operated means responsive to the rotation of the stylus for turning the cutting tool to face in the direction in which the cut is being made.

8. In a machine of the type indicated, means for supporting a cylindrical work-piece for oscillation about its longitudinal axis, means for supporting a plurality of cutting tools for simultaneously engraving a plurality of repeat designs on the periphery of the work-piece, power-operated means for oscillating the work-piece relatively of the cutting tools, power-operated means for moving the tool-supporting means longitudinally of the work-piece, a stylus for tracing the design, means actuated by the movement of the stylus to control the operation of the separate power-operated means whereby to reproduce a corresponding relative movement of the work-piece and tool-supporting means, and electromagnet means for simultaneously controlling the engagement of the plurality of cutting tools with the work-piece.

9. In a machine of the type indicated, a cutting tool for cutting a groove in a work-piece, power-operated means for relatively moving the cutting tool and work-piece in two directions at right-angles to each other, a stylus for tracing a design, means actuated by movement of the stylus to control the power-operated means to relatively move the work-piece and cutting tool to engrave a reproduction of the design traced by the stylus, said stylus being rotatable to face in the direction of the lines of the design being traced, power-operated means for rotating the tool in accordance with the rotation of the stylus to face the tool in the direction of the cut being made, and electromagnet means for controlling the engagement of the tool with the work.

10. In a machine of the type indicated, means for supporting a cylindrical work-piece for oscillation about its longitudinal axis, means for supporting a plurality of cutting tools for simultaneously cutting grooves in the periphery of the cylindrical work-piece, power-operated means for oscillating the work-piece relatively of the cutting tools, power-operated means for moving the tool-supporting means longitudinally of the work-piece, a stylus for tracing a design, means actuated by the movement of the stylus to control the operation of the power-operated means whereby to engrave a plurality of repeat designs on the periphery of the cylindrical work-piece, said stylus being rotatable to face in the direction of the lines of the design being traced, power-operated means controlled by the rotation of the stylus for rotating the plurality of tools to face in the direction of the cut being made, and electromagnet-operated means for controlling the engagement of the several tools with the work-piece.

11. In a machine of the type indicated, a cutting tool for engraving a design on a work-piece, power-operated means for effecting relative movement between the cutting tool and the surface of the work-piece in any direction, a pattern having a design delineated thereon, a manually-operable stylus for tracing the design on the pattern, means connecting the stylus to control the power-operated means to actuate the cutting tool to cause it to cut a design on the work-piece corresponding to the design on the pattern, and means for adjusting said connecting means to vary the proportion of the design on the work-piece relative to the size of the design on the pattern.

12. In a machine of the type indicated, a cutting tool for engraving a design on the periphery of a cylindrical work-piece, power-operated means for effecting relative movement between the cutting tool and the surface of the work-piece, a pattern held stationary during the relative movement between the cutting tool and work-piece, said pattern having a planar face with a design formed by lines extending in different directions on its face, a manually-operable stylus for tracing the design on the pattern, and means connecting the stylus to control the power-operated means to effect relative movement in different directions between the work-piece and cutting tool to reproduce the design on the work-piece.

13. In a machine of the type indicated, a cutting tool for engraving a design on a work-piece, a plurality of servo-motors for effecting relative movement between the cutting tool and the surface of the work-piece in any direction, said servo-motors having freely-movable control means and power-operated means adapted to instantaneously follow the movement of the control means, a pattern having a planar face with lines thereon forming a design, a manually-operable stylus for tracing the design on the pattern, and means connecting the stylus to operate the control means for the servo-motors to cause the cutting tool to reproduce the design on the work-piece in any desired proportion to the size of the design on the pattern.

14. In a machine of the type indicated, a cutting tool for engraving a design on a work-piece, a plurality of servo-motors for effecting relative movement between the cutting tool and work-piece in any direction, said servo-motors having freely-movable control means and power-operated means adapted to instantaneously follow the movement of the control means, a pattern having a planar face with lines recessed thereon forming a design, a manually-operable stylus for tracing the design on the pattern, and means operated by the stylus and connected to actuate the control means in any desired proportion to the extent of movement of the stylus to effect relative movement of the tool-holder and work-piece to engrave a design of predetermined size on the latter.

15. In a machine of the type indicated, a cutting tool for engraving a design on the surface of a work-piece, power-operated means for effecting relative movement between the cutting tool and the surface of the work-piece in one direction, a second power-operated means for effecting movement between the cutting tool and the surface of the work-piece in a direction at right-angles to its direction of movement by the first-mentioned power-operated means, a pattern having a planar face with a design delineated thereon, a manually-operable stylus for tracing the design on the pattern, means actuated by the stylus to control the operation of the power-operated means to follow the design traced by the stylus to engrave a reproduction thereof on the work-piece, and means for adjusting the control means to vary the proportion of the design on the work-piece relative to the size of the design on the pattern.

16. In a machine of the type indicated, a cutting tool for engraving a design on a work-piece, means for mounting said tool to adapt it to move into and out of engagement with the surface of the work-piece, power-operated means for causing relative movement between the cutting tool and the surface of the work-piece in any direction, a stationary pattern having a planar face with a design delineated thereon, a manually-operable stylus for tracing the design on the pattern, means actuated by the movement of the stylus to control the power-operated means, and separate manually-operable means for controlling the movement of the cutting tool into and out of cutting engagement with the work-piece.

17. In a machine of the type indicated, means for supporting a cylindrical work-piece, power-operated means for oscillating said work-piece about its longitudinal axis, a cutting tool for engraving a design on the periphery of the work-piece, power-operated means for moving the tool longitudinally of the work-piece, a pattern having a planar face with a design delineated thereon, a manually-operable stylus for tracing the design on the pattern, and means actuated by the movement of the stylus to control the operation of the separate power-operated means to oscillate the work-piece and move the cutting tool whereby to engrave a design on the surface of the work-piece corresponding to the design on the pattern.

18. In a machine of the type indicated, means for supporting a cylindrical work-piece, power-operated means for oscillating said work-piece about its longitudinal axis, a cutting tool for engraving a design on the periphery of the work-piece, power-operated means for moving the cutting tool longitudinally of the work-piece, a stationary pattern having a planar face with a design delineated thereon, a manually-operable stylus for tracing the design on the pattern, control means for the separate power-operated means, and means connecting the stylus to said control means to effect relative movement between the cutting tool and work-piece in right-angular directions whereby to engrave a design on the work-piece in reproduction of the design on the pattern.

BENJAMIN PICARD.
ANTHONY F. WARD.